United States Patent [19]
Fischer et al.

[11] 3,779,239
[45] Dec. 18, 1973

[54] CONNECTOR FOR FRACTURED BONES

[76] Inventors: Artur Fischer, Altheimer Strasse 219, Tumlingen, Germany; Jean-Nicolas Muller, 20 rue du Marechal Joffre, Strassburg, France

[22] Filed: Mar. 13, 1972

[21] Appl. No.: 234,102

[30] Foreign Application Priority Data

Mar. 13, 1971  Germany.......................... P 21 12 139.1

[52] U.S. Cl. ................................. 128/92 BC, 85/71
[51] Int. Cl. ............................................. A61f 5/04
[58] Field of Search ................... 128/92 BC, 92 BB, 128/92 CA, 92 R, 92 B, 92 D; 85/71, 70

[56] References Cited
UNITED STATES PATENTS

| 330,119 | 11/1885 | Holden | 85/71 |
|---|---|---|---|
| 2,236,079 | 3/1941 | Wipper | 85/71 |
| 2,559,281 | 7/1951 | Croessant | 85/71 |
| 3,143,915 | 8/1964 | Tendler | 85/71 |
| 3,479,081 | 11/1969 | Schaaf | 85/71 |
| 2,699,774 | 1/1955 | Livingston | 128/92 BB |

*Primary Examiner*—Richard A. Gaudet
*Assistant Examiner*—J. Yasko
*Attorney*—Michael S. Striker

[57] ABSTRACT

An elongated sleeve is insertable into a passage provided in a fractured bone, so as to bridge the fracture thereof. The front end of the sleeve carries an expansion anchor sleeve which is longitudinally slotted so that its circumferential wall is composed of strips which are connected only at the leading and trailing ends. The strips are buckled in radially outward direction by inserting a rod through the sleeve and connecting it with the leading end of the expansion anchor sleeve so as to exert a rearwardly directed tensile force upon the same, causing its buckling.

7 Claims, 1 Drawing Figure

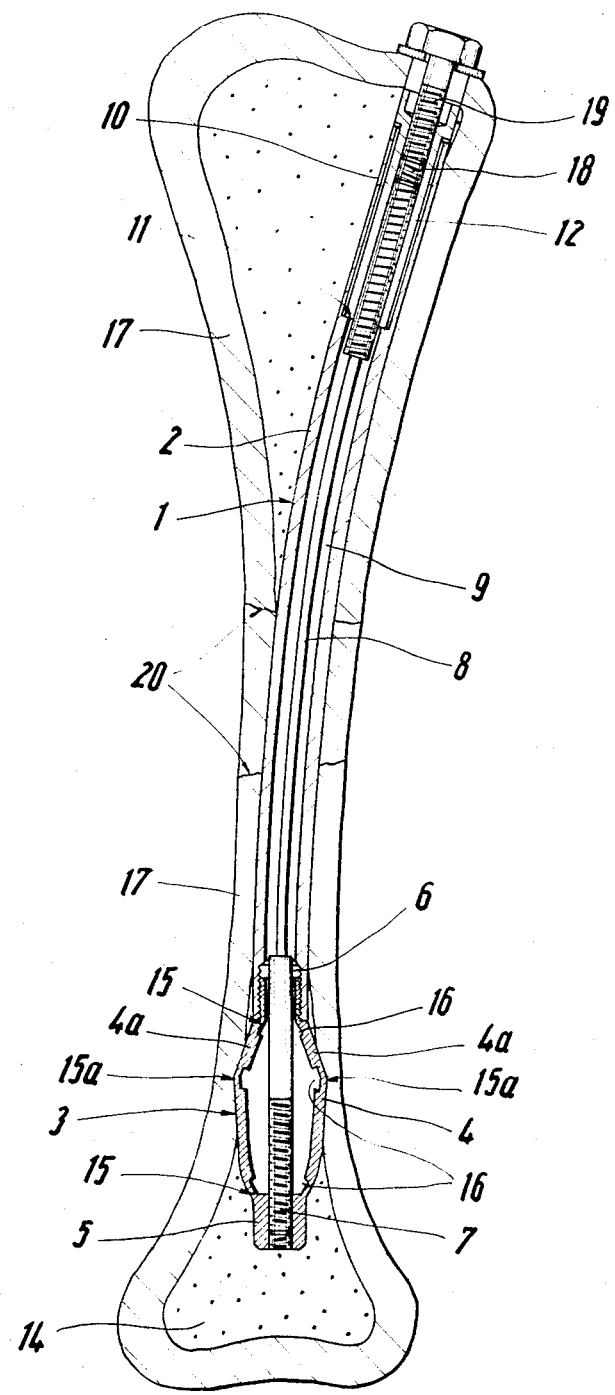

CONNECTOR FOR FRACTURED BONES

BACKGROUND OF THE INVENTION

The present invention relates generally to a surgical device, and more particularly to a connector for fractured bones.

It is already known to connect fractured bones in suitable manner in order to retain the bone fragments in their proper relationship with reference to one another until the fragments again heal together. Among these known connectors there is a type which can be anchored in the bone by providing it with an expansion anchor into which an expansion element is drawn, thereby spreading the expansion anchor by means of a threaded rod or fastening screw. The basic idea behind this concept is sound, but it has been found in practice that the prior-art proposals of this type are not very effective because only a small expansion of the expansion anchor sleeve is possible due to the friction of the expander body against the portions of the sleeve during drawing-in, and also due to the low elasticity of the materials which must necessarily be used. It will be appreciated that the selection of materials for such purposes is not left up to the designer for free choice in accordance with the desired characteristics, but is dictated by their suitability for use in connection with living tissue. Thus, a material which is inherently suitable for this purpose may not have other characteristics which it should desirably possess, for instance a relatively substantial elasticity.

Thus, the prior-art connectors provide in some instances a degree of expansion of the expansion anchor sleeve which is sufficient for the purposes at hand, but in other circumstances the degree of expansion is not sufficient. The latter is especially the case when the sleeve is to be anchored in the widened part of the bone marrow cavity of a tubular fractured bone. In addition, the torque required for the expansion, which must be taken up by portions of the connector, must be kept relatively small—especially in tubular bones— because only inadequate possibilities exist for securing the connection element against twisting in the bone.

SUMMARY OF THE INVENTION

It is, accordingly, a general object of the present invention to provide an improved connector for fractured bones.

More particularly, it is an object of the invention to provide such an improved connector in which a much more significant expansion of the expansion anchor portion can be obtained than was heretofore the case.

Another object of the invention is to provide for such highly increased degree of expansion at low expenditure of force, that is the expansion is to be achieved without having to apply great force.

In pursuance of these objects, and of others which will become apparent hereafter, one feature of the invention resides in a connector for fractured bones which, briefly stated, comprises elongated means having a front end and a rear end and being insertable into a passage in a fractured bone so as to bridge the fracture thereof. An expansion sleeve is provided at the front end and has a trailing end, a leading end and a peripheral wall comprising a plurality of elongated strip-shaped portions extending between and connected with one another at the leading and trailing ends, respectively. Expander means extends from the region of the rear end to the leading end and is operative for effecting radially outward buckling of the strip-shaped portions upon the exertion of a tensile force on the leading end in the direction towards the trailing end.

Advantageously, the rod constituting the expander means is at least in part threaded so that its threads can mesh with corresponding threads provided at the leading end of the expansion sleeve. However, it will be appreciated that there are several possibilities for effecting such an engagement, the choice being dependent upon the shape and intended use of the connector. If the connector is straight, expansion due to radial buckling may be achieved by threading a fastening screw or threaded rod into the sleeve, as mentioned above, and thereby exerting the desired tensile force upon the leading end of the sleeve as long as the screw or rod is prevented from axial forward movement after having reached engagement with the leading end of the sleeve. If, however, the connector is of curved configuration —as would particularly be the case if it is intended for repairing of fractures in tubular bones— then of course it is not usually possible to rotate the rod or screw in order to effect the necessary exertion of tensile force upon the expansion anchor sleeve because the cavity in such tubular bones is curved and the rod itself may either be curved or may have to be inserted through the cavity in such a position that it cannot be turned due to the cavity curvature. In any case, such a connector can then have its expansion sleeve expanded by connecting the rear end of the rod with a cap sleeve or nut which engages with threads on the rod and is itself prevented from forward movement so that, when the cap sleeve or nut is rotated, the rod is drawn axially rearwardly without having itself be turned.

As already pointed out above, the rod and a tubular sleeve which would normally surround the rod and constitute a part of the connector, may be curved in conformity with the interior wall of the bone marrow cavity if the connector is intended for repairing fractures in tubular bones. Surgeons normally use, in the repair of such fractures, a pin for the preliminary fixation and alignment of the bone fragments at the surface of the fracture, so that no displacement of the bone fragments relative to one another in the region of the fracture can impede the insertion of the connector. It has already been proposed to use the threaded rod itself in place of the pin to obtain the preliminary fixation of the bone fragments in connectors which are curved in conformity with the interior wall of the bone marrow cavity. A connector constructed in accordance with the present invention may be used in this manner also, and for this purpose it is provided with the aforementioned threaded rod, which is inserted into the bone marrow cavity in place of a pin, to obtain the alignment of the bone fragments with reference to one another. Thereupon, a tubular sleeve is pushed over the already inserted rod from the rear until the front face of the sleeve is in contact with a flange provided for this purpose at the front end of the threaded rod, and the latter is then drawn rearwardly by means of the aforementioned cap sleeve or nut, whereupon an axial stress is exerted upon the expansion sleeve carried at the front of the threaded rod with resultant radial buckling until adequate anchoring in the bone is achieved. It may be advantageous in the circumstances to construct the forward part of the threaded rod so that it has two oppositely located transverse projections by means of which recesses provided in the expansion anchor sleeve can be engaged, so that the sleeve can be releasably connected with the threaded rod.

The advantage of this method of effecting the expansion of expansion sleeves in the novel connector consists in that a large degree of expansion can be achieved with a small expenditure of force, because even a relatively small axial shifting of the rod will result in a significant radially outwardly directed buckling of the strip-shaped wall portions of the expansion sleeve. In contradistinction to the prior art, almost no frictional losses will occur such as take place when an expansion body is drawn into an expansion sleeve, so that almost the entire force employed will be active for effecting the buckling.

Because of the strip-shaped configuration of the portions of the peripheral wall of the expansion sleeve, the portions have sufficient elasticity not only to buckle readily but also to conform themselves to a high degree to the shape of the bone cavity, for instance the bone marrow cavity. This means that the pressure surface with which the sleeve engages the surrounding bone material is increased, so that not only excellent engagement and retention is obtained, but also the pressure per unit surface area cannot reach a value which locally would lead to destruction of the bone material.

The strip-shaped portions of the expansion sleeve may be of reduced cross-section at the future buckling locations, that is at the loci where buckling is intended to take place. This of course further increases the elasticity of these portions and decreases the force required to effect buckling. It also means that the precise position where buckling is to take place can be chosen at will.

The strip-shaped portions may be configurated so as to have "hinges" at the desired buckling loci to further reduce the amount of energy required for the buckling. They may also be slightly pre-buckled, that is they may be creased at the intended loci of buckling to further reduce the necessary force required to effect the buckling, particularly during the initial stage of the buckling or expansion.

The total length of each of the strip-shaped portions may be so divided by the future buckling locus that there is a ratio of 2 : 1 obtained, that is, when buckled, a strip-shaped portion may have one section corresponding to two-thirds of its length and another section corresponding to one-third of its length. The shorter sections will advantageously be immediately adjacent the threaded rod or the like and this arrangement provides improved lever ratios at the expansion anchor sleeve and thus benefits the expansion and particularly the form stability of the connector.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is an axial section through a tubular bone having a connector according to the present invention inserted therein.

DESCRIPTION OF THE PREFERRED EMBODIMENTS

Discussing the drawing in detail it will be seen that the bone per se is a tubular bone, although the connector can of course also be used with other bones. The bone is designated with reference numeral 17 and is shown to have two fracture lines 20, so that it is composed of three bone fragments. Being a tubular bone, it has a bone marrow cavity extending longitudinally which is of curved configuration, this cavity being identified in the drawing with reference numeral 14.

Inserted into the cavity, so as to bridge the fracture lines 20, is a connector according to the present invention. It is generally designated with reference numeral 1 and has a tubular sleeve 2 which is curved in conformance with the contour of the cavity 14. Connected to this sleeve 2 is an expansion anchor sleeve 3 whose circumferential wall is composed of a plurality of elongated strip-shaped portions 4 which are connected at the trailing end and at the leading end of the sleeve 3, the connection at the leading end being advantageously but not necessarily effected by a tubular portion 5. The latter is internally threaded and external threads 7 provided on the front end of a rod 6 can be brought into mesh with these internal threads.

If the rod 6 is curved in conformance with the contour of the bone marrow cavity and of the sleeve 2, as is the case in the illustrated embodiment, then it is of course necessary that it nevertheless be capable of being turned in the sleeve 2 in order to bring the threads 7 into mesh with those of the tubular portion 5. This means that at least a portion 8 of the rod must have such a cross section that it can be turned in the bore or passage 9 of the sleeve 2, and this may be achieved by reducing the cross section of the portion 8 sufficiently so that it can flex when the rod is turned.

The rear end of the sleeve 2 is provided with an enlargement 10 in the passage 9, and a cap sleeve or nut 12 is located in this enlargement and abuts against a shoulder 11 (or else against the rear end face of the sleeve 2). The cap sleeve 12 is internally threaded and again meshes with threads provided at the rear end of the rod 6 so that, when the sleeve 12 is turned, the rod 6 is drawn rearwardly in axial direction. This of course also exerts a rearwardly directed tensile force upon the front or leading end of the expansion anchor, namely upon the tubular portion 5 thereof, so that the portions 4 are caused to buckle radially in outward direction, as shown in the drawing, and thereby to become anchored in the cavity 14. The buckling is of sufficient magnitude, as shown, to provide for good anchoring even in circumstances where the passage (i.e. here the cavity 14) is of significant cross section.

Buckling takes place along the buckling lines or areas 15, and the location of these areas —especially of the middle areas 15a— can be predetermined by providing cross-sectional reductions 16 in the wall portions 4. The force and lever ratios can be advantageously influenced by so arranging the regions 15a that the overall length of the portions 4 is subdivided in a ratio of 2 : 1 with the shorter segments of the portions 4 being identified with reference numeral 4a and being directly adjacent the sleeve 2.

To install the connector in the bone 17, a needle can be inserted into the bone marrow cavity 14 via an appropriately drilled hole in the bone, whereupon the sleeve is pushed over this needle and the needle is withdrawn. It will of course be understood that as the sleeve 2 is pushed over the needle it carries the expansion anchor sleeve 3. Now the rod 6 is inserted into the passage 9, and its insertion and, in particular, the rotation necessary to effect engagement of its threads 7 with those of the tubular portion 5 is possible because of the cross-sectional reduction in the region 8 of the rod 6 which can therefore flex despite the fact that the sleeve 2 is curved.

It is advantageous if the length of the cap sleeve or nut 12 is so selected that when the rod has been withdrawn to the extent necessary to obtain a complete buckling of the portions 4, the end of the rod 6 threaded into the internal threads 18 of the cap sleeve 12 is so far inwardly spaced from the rear end of the sleeve 2 that a cap screw 19 can be also threaded into these threads 18, thus not only closing the threads 18 against contamination but also permitting engagement of the head of the screw 19 with the one adjacent bone fragment so as to exert pressure upon the same and thereby draw the bone fragments together and press them to one another along the fracture lines 20. This facilitates healing and also prevents relative displacement of the bone fragments.

The components of the connector 1 are advantageously made of material which is not only inert with respect to the bone tissue but is also acid- and corrosion resistant. Particularly suitable for this purpose is V2A steel (X12CRNI188) and V4A steel (X5CRNIMO1810).

It will be understood that each of the elements described above, or two or more together, may also find a useful application in other types of constructions differing from the types described above.

While the invention has been illustrated and described as embodied in a connector for fractured bones, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A surgical appliance, particularly a connector for fractured bones, comprising an elongated sleeve adapted for insertion into a passage in a fractured bone so as to bridge the fracture thereof, said elongated sleeve having a front end and a rear end; an expansion sleeve at said front end and having a trailing end, a leading end, and a peripheral wall including a plurality of elongated strip-shaped portions extending between and connected with one another at said leading and trailing ends, respectively; a cap sleeve at said rear end accommodated within said elongated sleeve, said cap sleeve being provided with internal screw threads; expander means extending through said elongated sleeve from the region of said rear end to said leading end and having external screw threads which mesh with said internal screw threads, said expander means being connected with said expansion sleeve so that rotation of said cap sleeve in a predetermined sense effects radially outward buckling of said strip-shaped portions; and screw means at said rear end mating with said internal screw threads and having a head portion located exteriorly of said passage which is adapted to abut said bone so that rotation of said screw means in a predetermined sense subsequent to outward buckling of said strip-shaped portions enables a compressive force to be exerted on said bone in a sense drawing the bone fragments together.

2. A surgical appliance as defined in claim 1, wherein said leading end is provided with internal screw threads, said expander means being a rod having external screw threads which mesh with said internal screw threads at said leading end.

3. A surgical appliance as defined in claim 1, at least some of said strip-shaped portions having a reduced cross-section intermediate said leading and trailing ends at loci where buckling is desired to occur.

4. A surgical appliance as defined in claim 1, at least some of said strip-shaped portions having a hinged section intermediate said leading and trailing ends at loci where buckling is desired to occur.

5. A surgical appliance as defined in claim 1, at least some of said strip-shaped portions being slightly creased at loci where buckling is desired to occur.

6. A surgical appliance as defined in claim 1; further comprising buckling-promoting means on said strip-shaped portions at loci where buckling is desired to occur and which are spaced from said trailing end by a distance corresponding to about one third of the distance to said leading end.

7. A surgical appliance as defined in claim 6, said strip-shaped portions being connected at said trailing end directly with said front end of said elongated sleeve.

* * * * *